(12) United States Patent
Säwström

(10) Patent No.: US 9,375,680 B2
(45) Date of Patent: Jun. 28, 2016

(54) ARRANGEMENT FOR PURIFYING CONTAMINATED GASES WITH IONIZED AIR

(71) Applicant: AirQone Building Scandinavia AB, Stockholm (SE)

(72) Inventor: Yngve Säwström, Skara (SE)

(73) Assignee: AirQone Building Scandinavia, AB, Stockholm (SE)

( * ) Notice: Subject to any disclaimer, the term of this patent is extended or adjusted under 35 U.S.C. 154(b) by 195 days.

(21) Appl. No.: 14/367,575

(22) PCT Filed: Dec. 21, 2012

(86) PCT No.: PCT/SE2012/051492
§ 371 (c)(1),
(2) Date: Jun. 20, 2014

(87) PCT Pub. No.: WO2013/095295
PCT Pub. Date: Jun. 27, 2013

(65) Prior Publication Data
US 2014/0314626 A1  Oct. 23, 2014

(30) Foreign Application Priority Data
Dec. 21, 2011 (SE) ...................... 1151245

(51) Int. Cl.
*B01D 53/32* (2006.01)
(52) U.S. Cl.
CPC .......... *B01D 53/32* (2013.01); *B01D 2257/702* (2013.01); *B01D 2257/704* (2013.01); *B01D 2257/708* (2013.01); *B01D 2258/0258* (2013.01); *B01D 2258/06* (2013.01)
(58) Field of Classification Search
CPC combination set(s) only.
See application file for complete search history.

(56) References Cited

U.S. PATENT DOCUMENTS

| 3,188,167 A | 6/1965 | Specht | |
|---|---|---|---|
| 3,949,551 A * | 4/1976 | Eichler | F01N 9/00 123/179.15 |

(Continued)

FOREIGN PATENT DOCUMENTS

| AT | 387158 | 12/1988 | |
|---|---|---|---|
| AT | 000387158 B * | 12/1988 | ............. B01D 53/32 |

(Continued)

OTHER PUBLICATIONS

International Search Report of parent PCT application No. PCT/SE2012/051492, Mar. 15, 2013, Sweden Patent Office, Stockholm, Sweden.

(Continued)

*Primary Examiner* — Duane Smith
*Assistant Examiner* — Sonji Turner
(74) *Attorney, Agent, or Firm* — Babcock IP, PLLC

(57) ABSTRACT

A purification arrangement for purifying a contaminated gaseous medium comprising: an ionizing equipment for ionizing air; a supply pipe for the supply of contaminated air; and at least one mixing chamber, wherein the contaminated air is fed through the mixing chamber in a main flow and ionized air is added to the main flow; an inlet for introducing ambient air into the main flow of the contaminated gaseous medium prior to the mixing chamber; a first temperature sensor arranged in the supply pipe prior to the inlet and configured to detect the temperature of the contaminated gaseous medium; wherein if the temperature of the contaminated gaseous medium detected by the first temperature sensor is above 70° C., ambient air is added through the inlet into the main flow.

10 Claims, 1 Drawing Sheet

(56) References Cited

U.S. PATENT DOCUMENTS

| | | | | |
|---|---|---|---|---|
| 5,653,106 | A | * 8/1997 | Katashiba | F01N 3/20 123/145.5 R |
| 5,750,823 | A | 5/1998 | Wofford et al. | |
| 5,964,089 | A | * 10/1999 | Murphy | B01D 53/90 60/274 |
| 6,012,283 | A | 1/2000 | Miller et al. | |
| 6,036,827 | A | * 3/2000 | Andrews | B01D 53/90 204/252 |
| 6,698,389 | B2 | * 3/2004 | Andrews | B01D 53/9454 123/41.31 |
| 2010/0282594 | A1 | 11/2010 | Langner | |
| 2010/0326051 | A1 | * 12/2010 | Busch | F01N 3/208 60/274 |
| 2011/0005199 | A1 | * 1/2011 | Kammer | F01N 3/0814 60/274 |
| 2011/0113753 | A1 | * 5/2011 | Christner | B01D 53/9409 60/274 |
| 2011/0315101 | A1 | * 12/2011 | Cleary | F02D 13/0207 123/90.15 |

FOREIGN PATENT DOCUMENTS

| | | | | |
|---|---|---|---|---|
| CA | 002287273 | A1 * | 10/1998 | B01D 53/32 |
| JP | 2004041847 | | 2/2004 | |
| WO | 9847603 | | 10/1998 | |
| WO | WO 0047603 | * | 10/1998 | B01D 53/32 |

OTHER PUBLICATIONS

Arnaldo De Biasio, European Search Report for Associated Case EP 12 86 0022, Jul. 14, 2015, European Patent Office, Munich Germany.

* cited by examiner

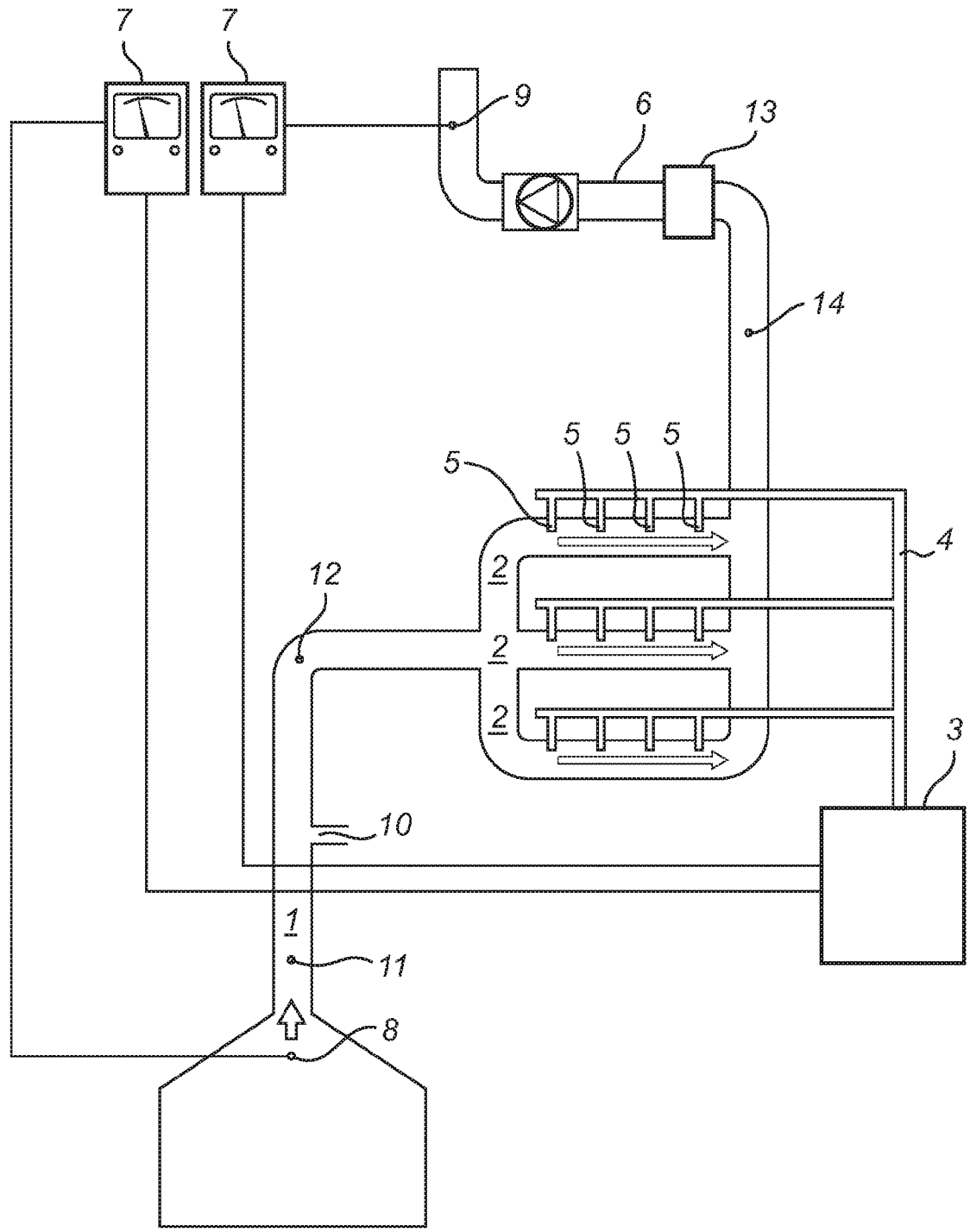

ARRANGEMENT FOR PURIFYING CONTAMINATED GASES WITH IONIZED AIR

FIELD OF THE INVENTION

The present invention relates to a purifying arrangement for purifying a contaminated gaseous medium. In particular, the present invention relates to a purifying arrangement comprising an ionizing equipment for ionizing air and at least one mixing chamber whereby the contaminated medium is fed through the mixing chamber in a main flow and ionized air is added to the main flow from the side.

TECHNICAL BACKGROUND

The demands on purifying exhausts from industries and the like are becoming larger as environmental consciousness increases in society.

A way to purify gaseous media from, for example, solvent based gases, paints etc such as benzine, paraffin, propene and other hydrocarbons occurs by means of ionizing. In this form of purifying, the contaminated air is mixed with ionized air. The charged particles cause the contaminating molecules to be combined and precipitated out.

An arrangement for exhaust gas purifying conforming with the preamble to the enclosed patent claims is for example known from AT 387 158 B whereby in a mixing chamber there is a main flow of contaminated air and a smaller flow of ionized air is added from the side.

However, such a known arrangement is burdened with several problems. The most serious problem is that the cost for obtaining the desired degree of purification is far too large or that the desired degree of purification is not possible to obtain at all.

SUMMARY OF THE INVENTION

It is accordingly an object of the present invention to provide a purification arrangement which is effective but still relatively cheap with regard to both investment costs and operation costs.

According to an aspect of the present invention, it is therefore provided a purification arrangement according to claim 1.

The present invention is based on the realization that to provide an improved purification arrangement for purifying a contaminated gaseous medium with ionizing air in the mixing chamber, the temperature and the flow of the ionizing air are substantially different from the contaminated gaseous medium. Furthermore, it is also realized that the efficiency of the purification process may be increased by maintaining the temperature of the contaminated gaseous medium entering the mixing chamber below a predetermined temperature.

The temperature of the contaminated gaseous medium that is supplied in the supply pipe may be as high as 80-90° C. The contaminated gaseous medium may for example comprise warm process air with a varying degree of contamination. At temperatures over 70° C., the reaction between ionized particles and the contaminated air in the mixing chamber of the purifying arrangement does not work in an optimal way. The purification process takes place in the mixing chamber wherein the contaminated gaseous medium is mixed with the ionized air and the purification process is improved when the temperature of the contaminated gaseous medium is 70° C. or lower.

An advantage of the invention is that the temperature of the contaminated gaseous medium is detected by the first temperature sensor and if the temperature of the contaminated gaseous medium exceeds 70° C., it is lowered to 70° C. before the main flow reaches the mixing chamber so that the efficiency of the purification arrangement is improved. Ambient air is added to the main flow in the supply pipe when the first temperature sensor detects a temperature over 70° C. Ambient air is added through an inlet arranged after the first temperature sensor in the supply pipe.

Another advantage of the invention is that several mixing chambers can be used to make the purifying arrangement more effective.

A further advantage of the invention is that the inlet for ambient air may also be utilized to lower the temperature of the contaminated gaseous medium further below the aforementioned predetermined limit by adding more ambient air to the main flow when the temperature of the ambient air is lower than the main flow.

In one embodiment of the invention, the purification arrangement may further comprise a second temperature sensor arranged in the supply pipe after the inlet, the second temperature sensor being configured to detect the temperature of the contaminated gaseous medium, wherein a flow of ionized air from the ionizing equipment is controlled based on the temperature detected by the second temperature sensor.

An advantage of this embodiment is that the temperature of the main flow of the contaminated gaseous medium may be lowered by adjusting the flow of the ionized air from the ionizing equipment.

Another advantage is that by increasing the feeding of the ionized air into the mixing chamber, the ionized air will penetrate down into the main flow quicker and will thereby increase the probability that a contaminating molecule is hit by ionized particles since more ionized particles are present in the mixing chamber.

According to one embodiment of the invention, the air to be ionized by the ionizing equipment may advantageously be ambient air.

An advantage with this embodiment is that it is effective and cost efficient to use ambient air. The ambient air can be fresh air from outside the purifying arrangement.

In one embodiment of the invention, the purification arrangement may further comprise a cooling element configured to reduce the temperature of the main flow after the main flow has passed the mixing chamber.

The cooling element may in another embodiment of the invention be arranged in the outlet pipe of the purifying arrangement.

The temperature of the main flow after the purification process before it is let out of the outlet pipe should preferably not exceed 30° C. The temperature of the main flow may accordingly be controlled both by the flow of the ionizing air and by the cooling element. The cooling effect from the flow of the ionizing air is also dependent on the relation between the amount of contamination in the contaminated gaseous medium and the amount of ionized air required in order to achieve sufficient purification in the mixing chamber.

An advantage of the cooling element is that it may cool the purified air to a predetermined temperature such as 30° C. or below before the air leaves the outlet pipe, thereby enabling the use of the air from the outlet in other processes.

In some embodiments, a temperature sensor arranged in the main flow after the mixing chamber may be used to detect whether the temperature of the main flow after the mixing chamber is above 30° C. and if the temperature exceeds this temperature, the main flow might be diverted through a cooling element in connection with the outlet pipe in a flow separate from the outlet pipe. The cooling element may for example be arranged in a separate pipe, wherein the separate pipe is attached to the outlet pipe and is configured to let the main flow through if the temperature of the main flow exceeds 30° C. If the temperature is 30° C. or less, this cooling step may be avoided and the air leaves the outlet pipe without passing the cooling element. The separate pipe comprising the cooling element may be reconnected with the outlet pipe after the cooling element so that the air leaves from the same outlet.

By feeding the ionized air into the mixing chamber with a velocity which substantially exceeds the flow velocity of the main flow the ionized air will quickly penetrate down into the main flow and thus the probability that a contaminating molecule of the main flow shall be hit by an ionized particle is substantially increased.

According to an embodiment of the invention, the ionized air is supplied further via several successively arranged openings in the flow direction of the main flow. In this way the probability increases further and thereby also the degree of purification.

According to an embodiment of the invention, at least three such openings may be arranged after each other.

According to an embodiment of the invention, the flow velocity of the ionized air may be at least 3 times as large as the flow velocity of the main flow.

According to an embodiment of the invention, the flow velocity of the ionized air may be at least 5 times as large as the flow velocity of the main flow.

According to an embodiment of the invention, the flow velocity of the ionized air may be about 10 times larger than the flow velocity of the main flow.

According to a further embodiment of the invention the ionized air may be added to the main flow with a flow direction which has at least an angle of 40 in relation to the flow direction of the main flow. By this means, the mixing is further improved.

BRIEF DESCRIPTION OF THE DRAWINGS

These and other aspects of the present invention will now be described in more detail with reference to the appended drawings showing an example embodiment of the invention, wherein:

FIG. 1 schematically illustrates a purification arrangement according to an embodiment of the present invention.

DETAILED DESCRIPTION OF PREFERRED EMBODIMENTS OF THE INVENTION

A purification arrangement according to an embodiment of the invention as illustrated in FIG. 1 comprises a supply pipe 1 for the supply of contaminated air, a purification part comprising three mixing chambers 2 and an outlet pipe 6 for removing purified air. A first temperature sensor 11 is arranged in the supply pipe 1. In the present embodiment, three mixing chambers 2 are used but of course other numbers, such as one, two or more mixing chambers may equally well be used. In between the first temperature sensor 11 and the mixing chambers 2, an inlet 10 is arranged in the supply pipe 1 to let ambient air mix with the contaminated gaseous medium in the supply pipe in order to lower the temperature of the main flow down to 70° C. when required. The criterion for letting ambient air into the supply pipe is that the first temperature sensor detects a temperature of contaminated gaseous medium to above 70° C.

A second temperature sensor 12 is attached to the supply pipe 1 between the mixing chambers 2 and the inlet 10.

The temperature sensors may for example comprise thermistors, thermocouples or resistive thermal devices, RTDs.

Through the mixing chambers 2 a main flow of contaminated air occurs. From the side, however, a further feed-flow of ionized air occurs. This air is ionized in an ionizing equipment 3 which comprises an electrically charged surface which by corona-discharges gives off electrons to the surrounding air. This air which shall be ionized must be relatively clean (Air Quality 1) to allow ionizing in a desired degree which, however, is the case with usual fresh air. The air is conducted after it has been ionized via pipes 4 to openings 5 in the sidewalls of the mixing chambers. Every mixing chamber 2 is in this embodiment example provided with four openings 5 which are arranged successively after each other in the flow direction of the main flow. Other numbers of openings are, however, of course possible but it is preferable to have more than one opening per chamber. More inlet openings give a better mixing but at the same time the speed (and the amount of gas) of the main flow increases which makes the purification process more difficult downstream. The highest temperature of the main flow in the mixing chamber 2 is preferably 70° C. The controlled flow from the openings 5 of the ionizing equipment 3 is based on the temperature detected by the second temperature sensor 12. The second temperature sensor 12 is configured to detect temperatures of at least 70° C. and depending on the detected temperature, the flow of the ionized air will be adjusted. A higher detected temperature will increase the flow velocity of the ionizing air with regard to the properties of the purification process.

After the mixing chambers 2, a cooling element 13 is arranged in the outlet pipe 6. The cooling element 13 is configured to cool the purified air to a temperature of 30° C. or below before it is released into the ambient air or is recycled for other use. The purified air will transfer the heat from the main flow to the cooling element 13 thereby reducing the temperature of the purified air. The cooling element 13 may for example comprise ribs attached in the outlet pipe 6 arranged to let the purified air flow between the ribs on the way out of the outlet pipe 6. The ribs may enclose a cooling medium 13 such as cold water which circulates and removes the heat from the purified gaseous medium as it flows past the ribs. The cooling medium may be any type of medium suitable for heat removal. The cooling element 13 should not be limited to the arrangement with ribs; the cooling element 13 may be executed in several different ways. The cooling element 13 may also be a pipe arranged as a helix around the outlet pipe 6 in thermal contact with the purified gaseous medium or any other type of heat exchanger known to the person skilled in the art.

A third temperature sensor 14 is arranged between the mixing chambers 2 and the cooling element 13. The temperature sensor 14 is configured to control the cooling element 13 so that the cooling effect of the cooling element 13 varies depending on the temperature detected by the temperature sensor 14. The cooling element 13 may for example be controlled by regulating the flow of cooling medium in the cooling element 13 such that if the temperature of the main flow after the mixing chambers 2 is below 30° C., no cooling medium flows in the cooling element 13.

The flow velocity of the ionized air is preferably appreciably much higher than the flow velocity of the main flow. The velocity relationship is suitably at least 3/1 and preferably at least 5/1. The velocity difference is important for allowing the ionized air to penetrate into the main flow. How great the optimal velocity relationship is will however depend on the contamination concentration and the density of the gas which is to be purified. Higher density means that the speed should be higher and lower density that the speed should be lower. Usually a velocity relation of about 10/1 is to be preferred. The flow velocity of the ionized air should however be at least 0.5 m/s so that the laws of mass inertia shall be applicable instead of the gas laws. Further, there is an upper critical velocity which is dependent on the shape of the openings 5. This upper velocity limit depends however on the total pressure but is usually about 18 m/s.

The openings 5 should further be arranged so that the direction of flow for the ionized air has an angle in relation to the flow direction of the main flow. This angle should be at least 40° and the addition of ionized air occurs preferably perpendicularly to the main flow. How great the angle should be depends however on the difference of density between the gases and the ionizing energy.

The purification arrangement according to the invention further comprises a control system 7. The control system 7 comprises a sensor 8 and 9 for measuring the degree of contamination in the incoming contaminated air and the purified outgoing air respectively. The difference between these values, for example given as a purification degree in the form of incoming contamination amount minus outgoing contamination amount and divided with the incoming contamination amount, can later be used for conducting the purification arrangement. The result from the sensors 8, 9 is therefore sent via conduits to the ionizing equipment 3 and is used for conducting the ionizing degree and the flow velocity of the ionized air. Normally, an admixture of 20-30% ionized air in the main flow is desirable. The sensors may, for example, be commercially available photo-ionizing instruments such as Photovac PID 2020 or Photovac IOS Plus.

Further parameters can also be used for the regulation such as the direct amount of impurities in the starting-air, the number of ions in the outgoing air, etc.

It is also an advantage to let the flow-pipe for the main flow expand before the mixing chambers 2, as occurs in the embodiment example, to thus decrease the flow velocity of the main flow through the mixing chambers 2.

It is further possible to combine the purification arrangement according to the invention with other types of purification such as filers of different kinds, etc. to further improve the purification effect in that way. The invention has been described above by means of an embodiment example. It is however realized by a person skilled in the art that more variants are possible, some of which have been mentioned, without losing the invention idea. Such obvious variants must therefore be regarded to be included in the present invention such as it is delimited by the following claims.

I claim:

1. A purification arrangement for purifying a contaminated gaseous medium comprising:
   an ionizing equipment for ionizing air;
   a supply pipe for the supply of contaminated air; and
   at least one mixing chamber, wherein the contaminated gaseous medium is fed through the mixing chamber in a main flow and ionized air is added to the main flow;
   an inlet for introducing ambient air into said main flow of said contaminated gaseous medium prior to the mixing chamber;
   a first temperature sensor arranged in said supply pipe prior to said inlet and configured to detect the temperature of the contaminated gaseous medium;
   wherein said inlet is configured to open to allow ambient air to enter through said inlet into said main flow if the temperature of the contaminated gaseous medium detected by said first temperature sensor is above 70° C.

2. Purification arrangement according to claim 1, further comprising a second temperature sensor arranged in said supply pipe after said inlet and configured to detect the temperature of the contaminated gaseous medium;
   wherein a flow of ionized air from the ionizing equipment is controlled based on the temperature detected by said second temperature sensor.

3. Purification arrangement according to claim 1, wherein the air to be ionized by said ionizing equipment is ambient air.

4. Purification arrangement according to claim 1, further comprising a cooling element configured to reduce the temperature of the main flow after said main flow has passed said mixing chamber.

5. Purifying arrangement according to claim 4, further comprising an outlet pipe, wherein said cooling element is arranged in said outlet pipe.

6. Purification arrangement according to claim 1, wherein the ionized air is supplied via several openings arranged successively after each other in the flow direction of the main flow.

7. Purification arrangement according to claim 6, wherein at least three such openings are arranged after each other.

8. Purification arrangement according to claim 1, wherein the flow velocity of the ionized air is configured to be at least 3 times as large as the flow velocity of the main flow.

9. Purification arrangement according to claim 1, wherein the flow velocity of the ionized air is configured to be at least 5 times as large as the flow velocity of the main flow.

10. Purification arrangement according to claim 1, wherein the flow velocity of the ionized air is configured to be about 10 times larger than the flow velocity of the main flow.

* * * * *